United States Patent [19]

Fuhl et al.

[11] Patent Number: 6,094,167
[45] Date of Patent: Jul. 25, 2000

[54] PROCESS AND DEVICE FOR RECEPTION WITH DIRECTIONAL RESOLUTION

[75] Inventors: Josef Fuhl; Ernst Bonek, both of Veinna, Austria

[73] Assignee: Telekom Austria Aktiengesellshaft, Vienna, Australia

[21] Appl. No.: 09/194,386

[22] PCT Filed: May 20, 1997

[86] PCT No.: PCT/AT97/00104

§ 371 Date: Feb. 18, 1998

§ 102(e) Date: Feb. 18, 1998

[87] PCT Pub. No.: WO97/44855

PCT Pub. Date: Nov. 27, 1997

[30] Foreign Application Priority Data

May 20, 1996 [AT] Austria ........................ 887/96

[51] Int. Cl.[7] .................................................. G01S 13/16
[52] U.S. Cl. ................................. 342/383; 342/378
[58] Field of Search ................................. 342/383, 378

[56] References Cited

U.S. PATENT DOCUMENTS

| | | | |
|---|---|---|---|
| 4,255,791 | 3/1981 | Martin | 364/514 |
| 4,717,919 | 1/1988 | Cherrette et al. | 342/383 |
| 4,780,721 | 10/1988 | Dobson | 342/383 X |
| 5,579,016 | 11/1996 | Wolcott et al. | 342/378 |
| 5,608,409 | 3/1997 | Rilling | 342/380 |

FOREIGN PATENT DOCUMENTS

| | | |
|---|---|---|
| 0 520 969 | 12/1992 | United Kingdom . |
| 0 540 387 | 5/1993 | United Kingdom . |
| WO 95/22873 | 8/1995 | WIPO . |
| WO 95/26116 | 9/1995 | WIPO . |

OTHER PUBLICATIONS

"Adaptive Antennas for Mobile Communications" E&CEJL, GB, Bd. 6, #4, Aug. 94, pp. 203–214, M. Barrett, R. Arnott.

T. Bull, M. Barrett, R. Arnott, "Technology in Smart Antennas for Universal Advanced Mobile Infrastructure (TSUNA-MIR2108) —Overview".

Proc. Race Mobile Telecom. Summit, Cascais, Prt. Nov. 22–24, 1995, pp. 88–97.

*Primary Examiner*—Mark Hellner
*Attorney, Agent, or Firm*—Herbert Dubno

[57] ABSTRACT

A group antenna has the weighting factors of the individual antenna elements and a forward and backward filter adapted based upon a decision circuit at the input of which the output signals of the two filters are subtracted one from the other. A Maximum Like Sequence Estimator receives the output of the forward filter directly while the decision feedback process is shut down for detection of subscriber data whereas the MLSE operates in parallel with the decision feedback process for continuous adaptation of the weighting factors.

2 Claims, 2 Drawing Sheets

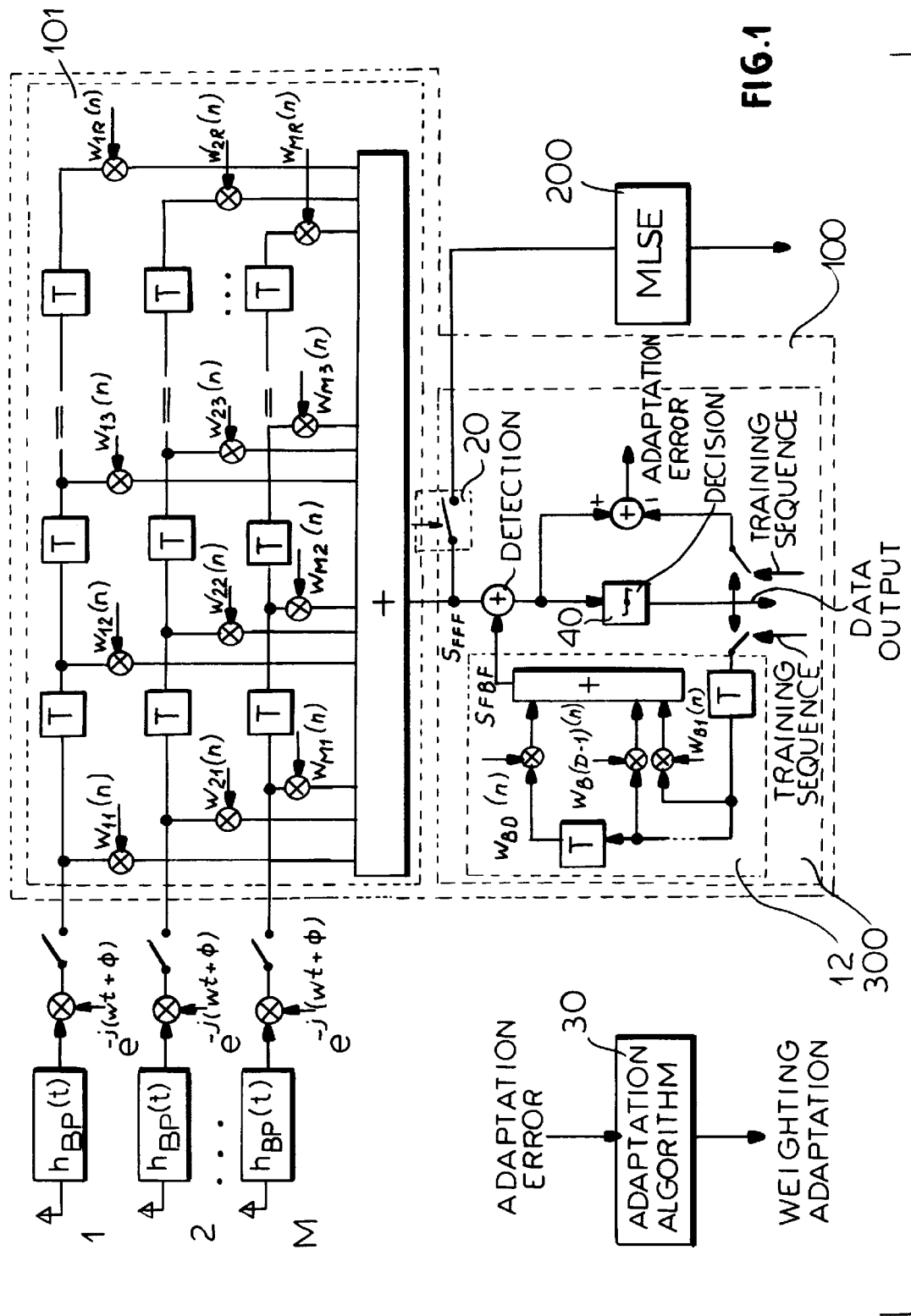

PROCESS AND DEVICE FOR RECEPTION WITH DIRECTIONAL RESOLUTION

CROSS REFERENCE TO RELATED APPLICATIONS

This application is a national stage of PCT/AT97/00104 filed May 20, 1997 and based upon Austrian national application A887/96 of May 20, 1996 under the International Convention.

FIELD OF THE INVENTION

Our present invention relates to a process for the directionally resolved reception of digital data by a phase-controlled group antenna which is provided with a circuit with which the directional characteristic of the group antenna is adjustable and adaptable in accordance with the to adaptive effect of antenna weighting factors in the interconnection of the individual antennas, whereby for the adjustment and adaptation of the directional characteristic a decision feedback process is used in which a nonlinear structure is provided comprised of a forward filter, a backward filter and a decision circuit, whereby the antenna signals are fed initially to the forward filter, then to the decision circuit, and from the decision circuit to the backward filter, whereupon the output signal of the backward filter is subtracted from the output signal of the forward filter. The invention relates further to a device for the directionally resolved reception of digital data in which a phase-controlled group antenna is provided and the group antenna has a circuit with which the directional characteristic of the group antenna is adjustable and adaptable in accordance with the adaptive effect of antenna weighting factors in the interconnection of the individual antennas, whereby for the adjustment and adaptation of the directional characteristic a nonlinear structure is provided comprised of a forward filter, a backward filter and a decision circuit, whereby the individual antennas are connected to the inputs of the forward filter, the output of the forward filter is connected to a subtractor whose output is connected to the input of the decision circuit which has its output connected to the input of the backward filter, the output of which is connected to the second input of the subtractor.

STATE OF THE ART

Directionally resolved reception is a promising new technique for increasing the range, reducing the common-channel is interference and thereby reducing the frequency repetition spacing in mobile communications.

The increase in the range is of interest in lightly settled regions and also for large umbrella cells in which overflow traffic from subordinate microcells must be absorbed. A further interesting field of application is radio access for fixed network subscribers ("radio in the local loop", RLL, or "radio in the loop", RITL).

The common channel interference is known to be the limiting influencing factor for well developed cellular mobile radio networks.

Directionally resolved reception, in which a maximum of the directional diagram of the receiving antenna is in the incident direction of the desired signal (of a subscriber) and/or zero locations of this directional diagram lie in incident direction of interference signals, reduces the common channel interference. These interference signals are, for example, signals which either derive from other subscribers in the same cell or from subscribers in foreign (distal) cells.

With this mode of operation it is possible to so reduce the frequency repetition spacing that in an extreme case, reuse of the same frequency is possible in a neighboring cell (channel group number equal to one). With the processes proposed to date for the directionally resolved reception, the lower limit of the angular separation at which the process breaks down is a significant problem. In the ideal case this lower limit should be 0°.

A process or a device of the type described at the outset is known from EP 604 956. According to this document, a signal at the output of the decision circuit is used as a data signal, that means that it should correspond with the transmitted signal. The problem here is that this signal is fed back to the input of the decision circuit via the backwards filter. Should a decision error arise, a false signal is then applied at the input of the decision circuit which can give rises to further decision errors. With considerable interference, for example in the case of mobile telephones in neighboring cells, the data signal is thus very often highly erroneous. For this reason, the system in EP 604 956 is only tested with reference to unmodulated sinusoidal carrier waves (page 8, lines 32–33, page 9, line 48) and with reference to multipath propagation (page 6, line 4).

In GB 2 229 580 A a circuit is described which is a portion of the circuit according to EP 604 956 A and indeed is the forward filter. With that system indeed a directional effect of the group antenna can be generated whereby interference through multipath propagation is reduced but not however nearly as well as with the circuit according to EP 604 956 A.

Another process or another apparatus for directionally resolved reception is described in WO 95/22873. According to this document the individual antenna of the group antenna are connected to a directional filter which has a multiplicity of outputs. These signals are fed to a common detector which detects the transmitted data on the basis of all the signals transmitted to it.

Finally in M. Barrett, R. Arnott, "Adaptive Antennas for Mobile Communications", Electronics and Communication Engineering Journal London, GB, Bd. 6, Nr. 4, August 1994, pp 203–214; T. Bull, M. Barrett, R. Arnott, "Technology in Smart Antennas for Universal Advanced Mobile Infrastructure (TSUNAMI R2108)—Overview", Proc. RACE Mobile Telecommunications Summit, Cascais, Portugal, Nov. 22–24, 1995, pp. 88–97; and in M. Tangemann, C. Hoeck, and R. Rheinschmitt, "Introducing Adaptive Array Antenna Concepts in Mobile Communication Systems", RACE Mobile Communications Workshop, May 17–19, 1994, Amsterdam, pp. 714–727, a further state of the art is described.

Here a group antenna with variable directional characteristics is used in which there is separation of desired subscriber signals and interference signals (referred to in total also as "interference"). The signal from each individual antenna element of the group is mixed at a lower frequency (intermediate frequency IF or base band BB). These IF or BB signals as time-discrete and value-discrete signals are used as input parameters for an efficient optimizing algorithm. The algorithm which determines the directional characteristic through the adaptive effect of the antenna weighting factors is realized by a signal processor or the like. This algorithm is either a "temporal-reference" algorithm as has been described for example in S. Ratnavel, A. Paulraj and A. G. Constantinides "MMSE Space-Time Equalization for GSM Cellular Systems", Proc. Institute of Electrical and Electronics Engineers, IEEE, Vehicular Technology Conference 1996, VTC '96, Atlanta, Ga., pp. 331–335, E.

Lindskog, A. Ahlen and Sternad, "Spatio-Temporal Equalization for Multipath Environments in Mobile Radio Applications", Proc. Institute of Electrical and Electronics Engineers, Vehicular Technology Conference 1995 VTC '95, Chicago Ill., U.S.A., Jul. 25–28, 1995, pp. 399–403, and O. Munoz and J. Fernandez, "Adaptive Arrays for Frequency Non-selective and Selective Channels", Proc. EUSIPCO '94, European Conference for Signal Processing, Edinburgh, pp. 1536–1539 or a "spatial-reference" algorithm as is described for example in M. Haardt and J. A. Nossek, "Unitary ESPRIT: How to Obtain an Increased Estimation Accuracy with a Reduced Computational Burden", IEEE Trans. on Signal Processing, Bd. 43, Nr. 5, May 1995, pp. 1232–1242, R. Roy and R. Kailath, "ESPRIT"-Estimation of Signal Parameters Via Rotational Invariance Techniques", IEEE Trans. Acoust., Speech, Signal Processing, Bd. 37, July 1989, pp. 984–995.

"Temporal-reference" algorithms rely on the (previous) recognition of a part of the signal, for example, an intentionally introduced training sequence for identification of the subscriber. In the Global System for Mobile Communications (GSM) such a standard is provided and service for the estimation of the radio channel or for the identification of the base station. By contrast thereto "spatial-reference" algorithms require no previous knowledge of the subscriber signals since these algorithms utilize the spatial-geometric arrangement of the individual antenna elements in the group.

The optimum reception process for detection of subscriber signals utilizes MLSE-detector (MLSE=maximum likelihood sequence estimation). The MLSE process is for example described in Lee/Messerschmitt, Digital Communication, pp. 271–278, Kluwer Academic Publishers, Dordrecht, Netherlands, 1st edition, 2nd print, 1990. MLSE detects a reception sequence in an optimum way, i.e. with the smallest possible bit error quota.

The combination of linear processing of the signals of the antenna elements and the MLSE is described in S. Ratnavel, A. Paulraj and A. G. Constantinides "MMSE Space-Time Equalization for GSM Cellular Systems", Proc. Institute of Electrical and Electronics Engineers, IEEE, Vehicular Technology Conference 1996, VTC '96, Atlanta, Ga., pp. 331–335.

The linear preprocessing which is required by Ratnavel has a drawback that with limited angular separation (for example within the half antenna main lobe width) the partial signals which are split off by multipath propagation and time-delayed subscriber signals allow the system to function like a linear equalizer in the time range. It is known, however, that linear equalizer structures are because intersymbol interference of multipath propagation (deep spectral zero locations in the transmission function)—only very limitedly suitable for equalization of mobile radio channels.

OBJECT OF THE INVENTION

The invention has as its object to improve the process or the device of the type described at the outset so as to combine in an optimum way the substantially nonlinear algorithm with an MLSE detector.

SUMMARY OF THE INVENTION

This object is achieved through a process of the type described at the outset, in accordance with the invention, in that for detection of the subscriber data, the sum of the weighted signals of the individual antennae is directly fed to an MLSE (maximum likelihood sequence estimator) while the decision feedback process is at standstill, or for continuous adaptation of the weighting factors the decision feedback process is permanently performed in parallel.

The device is characterized according to the invention in that for detection of the subscriber data an MLSE is provided whose input is connected to the output of the forward filter.

The length of the backward filter is thus matched to the length of the MLSE. The result is that all of the multipath fractions of the subscriber signal which is predominantly processed by the MLSE can be collected for maximizing the signal-noise separation while multipath fractions which fall outside the operating window of the MLSE, are treated like common channel interferences, i.e. eliminated.

This process has the advantages that common channel interferences are eliminated by the forward filter; that excessive time dispersion (that which lies outside the time window of the MLSE detector), is also eliminated by the forward filter; that as a consequence of the nonlinear adaptation of the antenna weighting signals from the same direction or from directions very close thereto, are better utilized than is the case in linear structures; and that usual MLSE detectors, which are today already realized in GSM receivers, can be used for combination of the multipath signals.

BRIEF DESCRIPTION OF THE DRAWING

The above and other objects, features, and advantages will become more readily apparent from the following description, reference being made to the accompanying drawing in which they show:

FIG. 1 is a schematic diagram as to principles of the new process; and

BEST MODE OF THE INVENTION

Figure 2A:
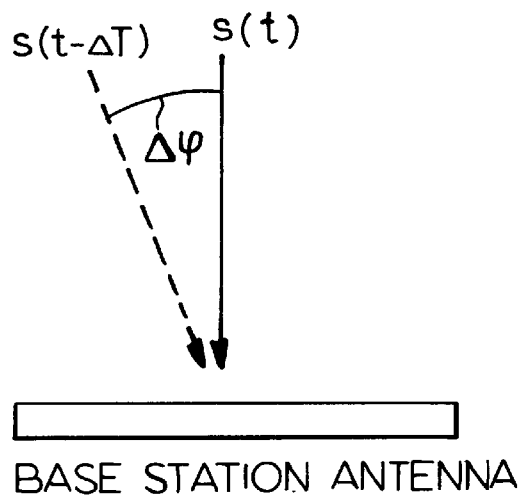
FIGS. 2a and 2b are diagrams illustrating the signal/noise separation by the use of the nonlinear preprocessing according to the invention of the subscriber signal by comparison to conventional linear processing.

FIG. 1 shows a schematic diagram of the process and the associated receiver structure.

The antenna elements 1 to M are connected with the forward filter 101, characterized by their weighting factors $W_{11}$ to $W_{MR}$. The bandpass filters downstream of the antenna elements are characterized by their transient responses $h_{BP}(t)$. The elements designated at T effect a delay in the applied signal by a duration T.

The processed signal $S_{FFF}$ from the forward filter 101 is supplied to the decision circuit 40. This circuit decides whether each signal applied at its input, that contains noise and distortion, signifies a logic 1 or a logic 0 and applies the corresponding signal at its output.

This clean signal is then fed to a backward filter 12. The backward filter 12 is a common linear structure whose length matches the processing window length D of the MLSE 200. The signal $S_{FFF}$ processed from the backward filter 12 is superimposed upon the signal $S_{FFF}$ coming from the forward filter 101 and supplied together to the decision circuit 40.

The switch 20 is closed for data detection. The nonlinear structure 300 can during the data detection either be used for continuous adaptation of the antenna weighting or can be shut down. The adaption algorithm 30 adapts the weighting factors $W_{11}$ to $W_{MR}$ for the forward filter 101 and those ($W_{B1}$–$W_{BS}$) for the backward filter 12. For this purpose a known algorithm as described for example in S. Haykin, Adaptive Filter Theory, Prentice-Hall, Englewood Cliffs, N.J., 1986 can be used.

FIG. 2a shows a simple, but typical, scenario as arises with a base station antenna in mobile radio. Two partial signals of a subscriber signal arrive at the base station and are angularly separated by the value Δφ and in time by ΔT. This gives rise to a spectral incursion into the transfer function of the channel.

Figure 2B:
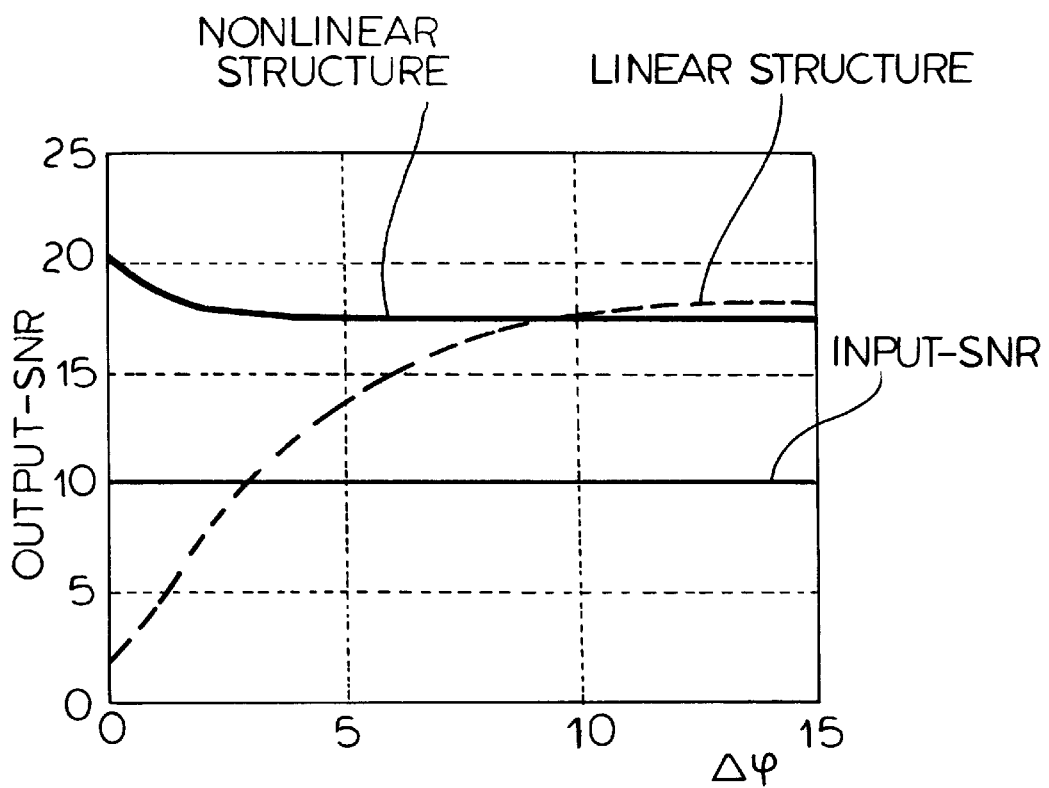

FIG. 2b shows the output SNR obtained by computer simulation as a function of the incident angle difference Δφ for the receiving antenna group, a linear arrangement with M=8 antenna elements and a spacing of 0.5λ between these elements is used. The input signal/noise spacing (SNR, Signal-to-Noise Ratio) per signal amounts to 10 dB. For the temporal separation of the partial signals, a typical value ΔT=T was used. For optimal combination of the antenna signals, an output SNR of about 20 dB is possible which justifies the higher cost of the antenna group by comparison to simple conventional antennas. Linear structures do not in any case show the desired improvement when Δφ<10°. By contrast the structure of the invention shows excellent results independently of the angle difference Δφ.

We claim:

1. A process for operating a phase controlled group antenna which comprises the steps of:

(a) collecting digital data with a plurality of antenna elements having respective weighting factors;

(b) feeding said digital data through a forward filter having respective weighting factors and producing a processed forward-filter output signal ($S_{FFF}$) representing a sum of weighted signals from the individual antenna elements;

(c) processing said output signal ($S_{FFF}$) in a decision circuit;

(d) subjecting an output of said decision circuit to a backward filter having respective weighting factors to produce a backward-filter output signal ($S_{FFF}$) in a decision feedback process;

(e) subtracting said backward-filter output signal ($S_{FFF}$) from said forward-filter output signal ($S_{FFF}$) at an input to said decision circuit;

(f) for detection of subscriber data, shutting down the decision feedback process and feeding the forward-filter output signal ($S_{FFF}$) representing a sum of weighted signals from the individual antenna elements directly to a Maximum Likelihood Sequence Estimator; and (g) permanently switching on said decision feedback process in parallel with said Maximum Likelihood Sequence Estimator for continuous adaptation of said weighting factors.

2. A phase-controlled group antenna system comprising a plurality of antenna elements forming a group antenna;

means for weighting data collected with said antenna elements with respective weighting factors;

a forward filter connected to said antenna elements and having respective weighting factors for producing processed forward-filter output signals representing a sum of weighted signals from the individual antenna elements;

a decision circuit capable of distinguishing between clean and defective signals connectable to said forward filter and having a data output;

a backward filter connected between said output of said decision circuit and an input thereof and having respective weighting factors and producing a backward-filter output signal in a decision-feedback process;

means at the input of said decision circuit for subtracting said backward-filter output signal from said forward-filter output signal;

a Maximum Likelihood Sequence Estimator connectable in parallel to said decision circuit; and means for shutting down the decision-feedback process and feeding the forward-filter output signal representing a sum of weighted signals from the individual antenna elements directly to said Maximum Likelihood Sequence Estimator and for permanently switching on said decision-feed process in parallel with said Maximum Likelihood Sequence Estimator for continuous adaptation for the weighting factors.

* * * * *